Figure 1:
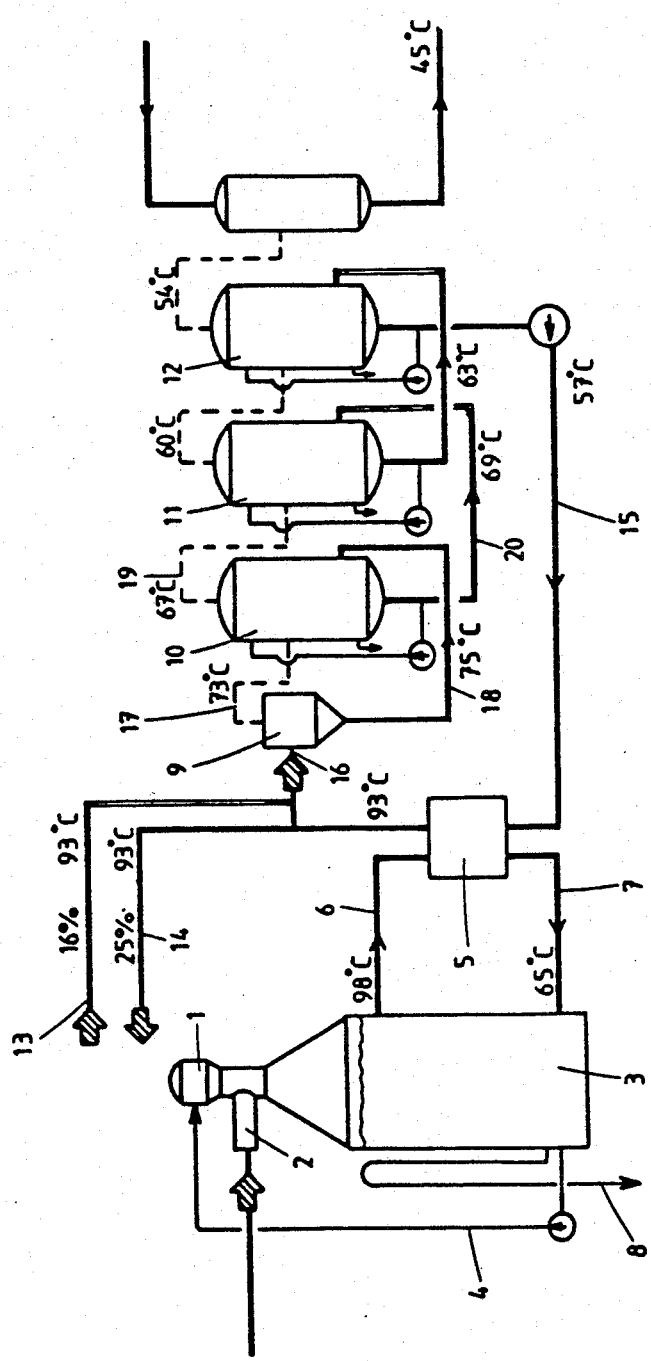

United States Patent [19]

Ryham

[11] Patent Number: 4,789,428
[45] Date of Patent: Dec. 6, 1988

[54] METHOD FOR EVAPORATION OF SPENT LIQUOR

[75] Inventor: Rolf Ryham, Sollentuna, Sweden
[73] Assignee: Ahlströmforetagen Svenska AB, Norrköping, Sweden
[21] Appl. No.: 870,125
[22] Filed: Jun. 3, 1986
[30] Foreign Application Priority Data
  Jul. 11, 1985 [SE] Sweden ............................... 8503450
[51] Int. Cl.$^4$ ........................... B01D 1/26; B01D 3/06
[52] U.S. Cl. .................................. 159/47.3; 159/2.3;
    159/17.3; 159/23; 159/DIG. 8; 159/DIG. 32;
    203/27; 203/88; 203/DIG. 8; 202/174;
    202/235; 162/46; 162/47
[58] Field of Search ....................... 159/47.3, 2.3, 17.3,
    159/23, DIG. 8, DIG. 32; 202/174, 235;
    203/88, DIG. 8, 27; 162/46, 47

[56] References Cited

U.S. PATENT DOCUMENTS

| | | | |
|---|---|---|---|
| 3,286,763 | 11/1966 | Jacoby | 159/47.3 |
| 3,289,736 | 12/1966 | Rosenblad | 159/47.3 |
| 3,492,198 | 1/1970 | Rosenblad | 159/47.3 |
| 3,753,851 | 8/1973 | Gaillard | 159/47.3 |
| 4,076,576 | 2/1978 | Marttala | 159/47.3 |
| 4,333,800 | 6/1982 | Henricson | 159/47.1 |

OTHER PUBLICATIONS

Rosenblad, "*Evaporator Systems For Black Liquor Concentration*", CEP, Apr. 1976, pp. 53–60.
Jacoby, "*Evaporation by Secondary and Waste Heats*", Jul. 1966, vol. 49, No. 7, pp. 95–97.

Primary Examiner—David L. Lacey
Assistant Examiner—V. Manoharan
Attorney, Agent, or Firm—Toren, McGeady & Associates

[57] ABSTRACT

The invention relates to a method for evaporation of spent liquor by heat from a blow condenser where blow steam from a pulp cooker is condensed in a direct condenser connected with a hot water accumulator. Spent liquor heated indirectly by hot water from the accumulator is brought to expand and released expansion vapor is used as a heat medium in a following evaporation stage. The apparatus comprises a heat exchanger, at least one flash tank and at least one evaporation unit, the heat exchanger being disposed to receive hot water from the upper part of the accumulator and to return it to its lower part and thus heat the spent liquor, and the flash tank being disposed to receive spent liquor heated in the heat exchanger and to release liquor vapor and spent liquor to the evaporation unit.

5 Claims, 2 Drawing Sheets

METHOD FOR EVAPORATION OF SPENT LIQUOR

The present invention relates to a method and an apparatus for evaporation of spent liquor. The invention is meant to be used in sulphate cellulose plants where the contents of a digester is blown to a blow tank, the steam line of which is connected to a direct condenser which again is connected to a hot water accumulator. Another pipe leads the pulp and the liquor from the blow tank to a washing plant.

The object of the present invention is to use the heat from the blow condenser for pre-evaporation of spent liquor from the washing plant.

It is nothing new to pre-evaporate by means of heat from a blow condenser. The most customary method is to let hot accumulator water with a temperature of 95°–100° C. to expand in 2–3 stages and to use expansion vapor in a 1–2 stageevaporation.

A disadvantage with this method is that a potential liquor expansion of 2–3 stages is lost by letting the accumulator water expand instead of spent liquor.

In another somewhat better method, accumulator water is cooled on one side of a heating surface by means of evaporating liquor on the other side. A disadvantage of this method is that a potential difference in temperature between the top and the bottom of the accumulator cannot be used. In this way the accumulator will be 3 times bigger than otherwise necessary.

U.S. Pat. No. 3,286,763 shows a method in which expansion vapor from accumulator water is used as a heating medium in an evaporator (FIG. 1) and another in which accumulator water is used as a heating medium in an evaporation stage (FIG. 2).

The suggested method uses expansion of spent liquor in a way which allows maximum use of the difference in temperature in the accumulator. Hot water from the top of the accumulator is pumped via a heat exchanger and cooled from 98°–100° C. to 60°–65° C. by means of heating spent liquor from 55°–60° C. to 90°–95° C. The heated liquor expands thereafter in e.g. four stages where the first stage supplies vapor to the first of the three evaporation effects. This provides a total evaporation of 2–3 ton water per one ton condensed vapor in the accumulator. The pipes feeding the spent liquor to and from the plant are suitably connected to the system after the first flash tank.

The method according to the invention is mainly characterized in that spent liquor heated indirectly by hot water from an accumulator is brought to expand and released expansion vapor is used as a heating medium at a following evaporation stage.

The apparatus according to the invention is characterized in that it comprises a heat exchanger, at least one flash tank and at least one evaporation unit, the heat exchanger being disposed to receive hot water from the upper part of an accumulator and thus heat spent liquor, and the flash tank being disposed to receive spent liquor heated in a heat exchanger and to release liquor vapor and spend liquor to an evaporation unit.

BRIEF DESCRIPTION OF THE DRAWING(S)

Figure 2:
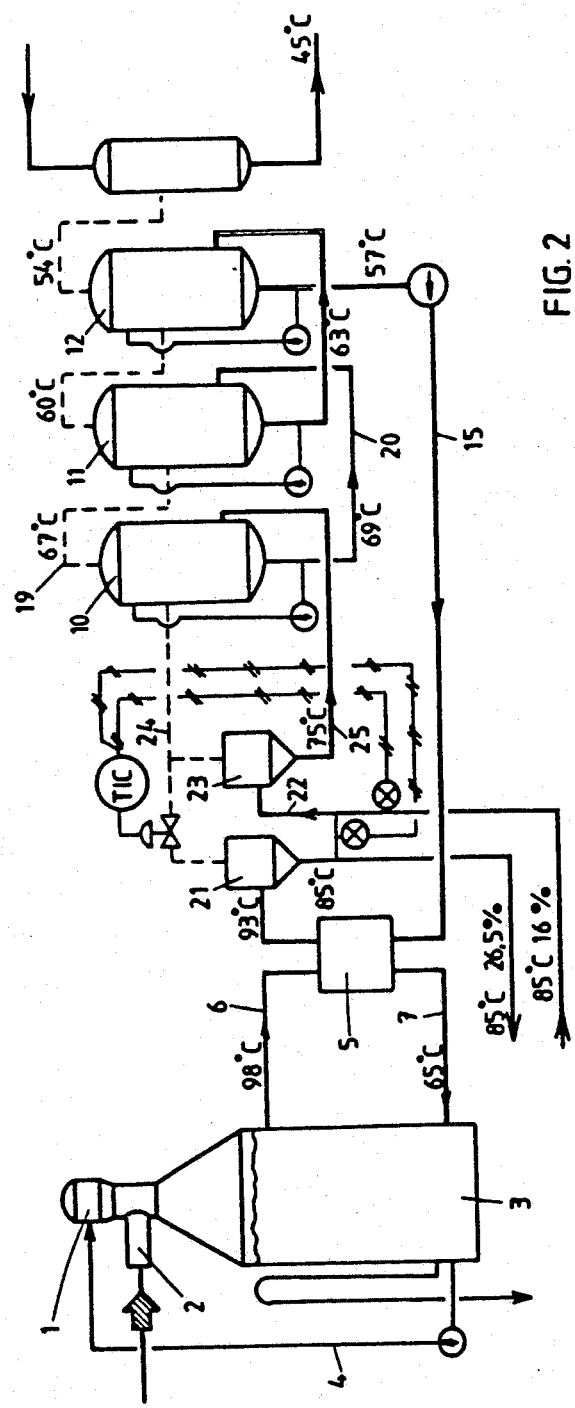

The invention is described in detail in the following with reference to the accompanying drawings, in which FIG. 1 shows a flow sheet for one evaporation system used in one application of the invention; and FIG. 2 shows an alternative embodiment.

The reference number 1 in FIG. 1 refers to a direct condenser to which vapor from a blow tank (not shown) is led by means of a pipe 2. The direct condenser is connected to a hot water accumulator 3. Due to the fact that water is removed from the accumulator and returned to it in a way described below, a difference in temperature arises between the upper and the lower part of the accumulator. Cooled water is removed from the lower part of the accumulator and led via a pipe 4 to a direct condenser to condense blow steam whereby the water is reheated.

The reference number 5 refers to a heat exchanger through which water flows that is discharged from the upper part of the accumulator via a pipe 6 and returned to its lower part via a pipe 7. Excess liquid is discharged from the lower part of the accumulator via a pipe 8.

Weak liquor from the digester having a dry solids content of e.g. 16% and a temperature of 93° C. is evaporated in an evaporation plant comprising one flash tank 9 and three evaporation units 10, 11 and 12 connected in series.

The evaporation units are in a way known per se provided with heat exchange surfaces for heating and evaporating liquor by means of a heating medium, and with an expansion chamber where liquor is subjected to a decreased pressure and to an expansion evaporation. An evaporation plant of this kind is shown in e.g. U.S. Pat. No. 3,366,158.

Weak liquor is led to the evaporation plant via a pipe 13 and concentrated liquor is discharged to a final evaporating stage for evaporation to a still higher dry solids content via a pipe 14.

Liquor from the last evaporation stage 12 having a dry solids content of 25% and a temperature of 57° C. is led via a pipe 15 to a heat exchanger 5 and heated there up to 93° C. Part of the heated liquor is mixed with incoming thin liquor with the same temperature and fed into a flash tank 9 via a pipe 16. The remaining liquor is led to further treatment via a pipe 14. Due to the decreased pressure in the flash tank the mixture of weak liquor and concentrated liquor releases vapor which is led via a pipe 17 to the heat exchanger of the first evaporation stage 10 in order to serve as a heating medium in this. Liquor from the flash tank is led via a pipe 18 to this evaporation stage and is there brought in contact with the heat surfaces of the heat exchanger. Due to a lower pressure in the evaporation unit the liquor boils at a lower temperature than that of the supplied liquor vapor and consequently vapor is generated. The vapor is led to a following evaporation unit 11 via a pipe 19. The liquor concentrated in the evaporation unit 10 is discharged via a pipe 20 to an evaporation unit 11 and is further concentrated there. Correspondingly the liquor from the evaporation unit 11 is concentrated in the last evaporation unit 12.

In the embodiment of the invention shown in FIG. 1, it has been presumed that the incoming liquor and the concentrated and heated liquor have the same temperature. It is, of course, possible that they have different temperatures.

FIG. 2 shows an alternative embodiment in which concentrated liquor, which from the last evaporation stage 12 has been led to a heat exchanger 5 via a pipe 15 and heated there, is brought to expand in a first flash tank 21. Parts of the liquor from the flash tank is led together with the incoming liquor to another flash tank 23 via a pipe 22. The temperature of the liquor from the flash tank 21 is adapted to being the same as the temperature of the incoming liquor, e.g. 85° C. Liquor vapors from both flash tanks are fed via a pipe 24 and liquor from the flash tank 23 via a pipe 25 to the first evaporation stage 10, which is provided with heat exchanger surfaces.

Otherwise the method functions according to the method in FIG. 1.

Components the function of which are identical in both embodiments are referred to with the same reference number.

The invention is not limited to the above embodiments but it can be modified and applied within the inventive concept defined by the claims.

I claim:

1. In a method for evaporating spent liquor wherein blow steam from a pulp cooker is condensed in a direct condenser connected with a hot-water accumulator, wherein the improvement comprises:
   heating spent liquor indirectly by hot water from the accumulator;
   bringing spent liquor heated indirectly by hot water from the accumulator to expand to release expansion spent liquor vapor in a first expansion stage;
   using the released expansion spent liquor vapor of said first expansion stage as a heat medium in a subsequent evaporation stage;
   concentrating the remaining spent liquor by evaporation in said evaporation stage;
   mixing a concentrated spent liquor with a weak spent liquor to be evaporated; and
   bringing the obtained mixture to expand in a second expansion stage, vapor from the second expansion stage being further used as a heat medium in said evaporation stage.

2. In a method for evaporating spent liquor wherein blow steam from a pulp cooker is condensed in a direct condenser connected to a hot water accumulator, wherein the improvement comprises:
   concentrating spent liquor by evaporation in at least one evaporation stage;
   passing the concentrated spent liquor through a heat exchanger for indirect heating with the hot water from the accumulator;
   expanding the heated concentrated spent liquor in a flash tank to release expansion spent liquor vapor and to leave remaining spent liquor;
   supplying the released expansion spent liquor vapor to the evaporation stage for use as a heating medium for heating the evaporation stage;
   supplying the remaining spent liquid from the flash tank to the evaporation stage to form the concentrated spent liquor for heating in the heat exchanger; and
   adding weak spent liquor to the concentrated spent liquor to form a mixture for expansion in the flash tank.

3. The method according to claim 1 or 2 wherein hot water is removed from the upper part of the accumulator and returned to its lower part.

4. In an apparatus for evaporation of spent liquor wherein blow steam from a pulp cooker is condensed in a direct condenser (1) connected with a hot water accumulator (3), wherein the improvement comprises: a heat exchanger (5), at least one flash tank (9) and at least one evaporation unit (10), the heat exchanger (5) is connected so as to receive hot water from the upper part of the accumulator (3) and to return cooled water to the lower part of said accumulator and thus heat the spent liquor, the flash tank is connected so as to receive spent liquor heated in the heat exchanger and to release expansion spent liquor vapor to the connecting evaporation unit, the evaporation unit having an outlet (15) connected to the heat exchanger for returning a concentrated spent liquor to the heat exchanger for further heating.

5. The apparatus according to claim 4 wherein there are a plurality of in series connected said at least one evaporation units (10, 11, 12) provided with an expansion chamber.

* * * * *